(12) United States Patent
Varoquie et al.

(10) Patent No.: US 10,113,930 B2
(45) Date of Patent: Oct. 30, 2018

(54) METHOD FOR DETERMINING THE TOTAL PRESSURE IN THE CYLINDER OF AN ENGINE (71) Applicants: CONTINENTAL AUTOMOTIVE FRANCE, Toulouse (FR); CONTINENTAL AUTOMOTIVE GMBH, Hannover (DE)

(72) Inventors: Bertrand Varoquie, Eaunes (FR); Christophe Bouquey, Colomiers (FR)

(73) Assignees: CONTINENTAL AUTOMOTIVE FRANCE, Toulouse (FR); CONTINENTAL AUTOMOTIVE GMBH, Hannover (DE)

(*) Notice: Subject to any disclaimer, the term of this patent is extended or adjusted under 35 U.S.C. 154(b) by 0 days.

(21) Appl. No.: 15/328,817

(22) PCT Filed: Jul. 21, 2015

(86) PCT No.: PCT/EP2015/001502
§ 371 (c)(1),
(2) Date: Jan. 24, 2017

(87) PCT Pub. No.: WO2016/012095
PCT Pub. Date: Jan. 28, 2016

(65) Prior Publication Data
US 2017/0212002 A1    Jul. 27, 2017

(30) Foreign Application Priority Data
Jul. 24, 2014 (FR) .................................. 14 57143

(51) Int. Cl.
*G01L 23/20* (2006.01)
*F02D 35/02* (2006.01)
(Continued)

(52) U.S. Cl.
CPC ............ *G01L 23/30* (2013.01); *F02D 35/024* (2013.01); *F02D 41/40* (2013.01); *G01M 15/08* (2013.01)

(58) Field of Classification Search
CPC ....... G01L 23/30; G01L 23/32; G01L 27/005; G01M 15/08; G01M 15/05; G01M 15/06;
(Continued)

(56) References Cited

U.S. PATENT DOCUMENTS 5,492,101 A * 2/1996 Saito ..................... F02D 41/047
123/480
6,530,361 B1 * 3/2003 Shiraishi ................... F02B 1/12
123/305

(Continued)

FOREIGN PATENT DOCUMENTS

DE    10 2008 044 013 A1   12/2009
DE    10 2012 221 245 A1    5/2014
(Continued)

OTHER PUBLICATIONS

International Search Report, dated Nov. 4, 2015, from corresponding PCT Application.

*Primary Examiner* — Lindsay Low
*Assistant Examiner* — George Jin
(74) *Attorney, Agent, or Firm* — Young & Thompson (57) ABSTRACT

A method (45) for determining the total pressure in a cylinder ($P_{cyl}$) of an engine as a function of the angular position (crk) of a crankshaft (14) and from a quantity of fuel to be injected in possibly several injections, includes:
determining the pressure in the cylinder when there is no combustion, the pressure being called the pressure without combustion ($P_{cyl\_m}$),
determining, for each injection ($inj_i$), a curve of sub-variation of pressure ($\Delta P_{comb\_i}$) caused by the combustion of the fuel quantity injected during the such
(Continued)

injection ($inj_i$), the shape of the curve being estimated as a function of the quantity of fuel to be injected ($MF_i$) and of the angular position for start of injection ($SOI_i$) of the corresponding injection, determining the total pressure in the cylinder ($P_{cyl}$) by adding together the pressure without combustion ($P_{cyl\_m}$) and the pressures given by the pressure sub-variation curves ($\Delta P_{comb\_i}$) of each injection ($inj_i$).

20 Claims, 4 Drawing Sheets

(51) Int. Cl.
  *G01L 23/30* (2006.01)
  *G01M 15/08* (2006.01)
  *F02D 41/40* (2006.01)

(58) Field of Classification Search
  CPC .. G01M 15/04; F02D 35/024; F02D 41/2477; F02D 41/2438; F02D 41/2429; F02D 41/2432; F02D 41/40; F02D 41/1448; F02D 41/1458; F02D 41/401; F02D 43/04; F02D 2041/1433; F02D 2041/007; F02D 2200/0002; F02D 2200/0006
  See application file for complete search history.

(56) References Cited

U.S. PATENT DOCUMENTS

| | | | |
|---|---|---|---|
| 6,782,737 B2 | 8/2004 | Wright | |
| 7,725,199 B2 | 5/2010 | Brackney | |
| 8,095,294 B1* | 1/2012 | Griffiths | F02D 35/024 |
| | | | 123/525 |
| 2005/0022789 A1* | 2/2005 | Palma | F02D 35/024 |
| | | | 123/435 |
| 2015/0285710 A1* | 10/2015 | Akazaki | G01M 15/08 |
| | | | 73/114.16 |
| 2015/0337790 A1* | 11/2015 | Schuele | F02D 41/22 |
| | | | 123/406.43 |
| 2017/0082054 A1* | 3/2017 | Stenlaas | F02D 41/1497 |

FOREIGN PATENT DOCUMENTS

| | | |
|---|---|---|
| FR | 2 892 459 A3 | 4/2007 |
| WO | 2005/103640 A2 | 11/2005 |

* cited by examiner

METHOD FOR DETERMINING THE TOTAL PRESSURE IN THE CYLINDER OF AN ENGINE

The present invention generally relates to a method for determining the total pressure in an engine cylinder. It also relates to the control of the quantity of fuel to be injected into an engine.

The invention is used, in particular, in the sector of motor vehicles and more precisely direct injection engines.

A direct injection engine comprises at least one cylinder into which fuel is injected using an injector. A piston moves in the cylinder and compresses the gas mixture located inside the cylinder. For better management of the operation of the engine, the quantity of fuel to be injected must be controlled in an extremely precise manner so as to prevent, on the one hand, injecting too little fuel which would cause a combustion action on the piston that is less than that expected and, on the other hand, injecting too much fuel which would needlessly increase the consumption of the latter. The fuel quantity injected by an injector depends, firstly, on the pressure of the fuel feeding the injector and, secondly, on the opening time of the injector. However, the pressure in the cylinder acts against the injection of fuel and influences the fuel quantity injected. The pressure in the cylinder, or counter-pressure from the perspective of the injector, is due both to the air compression by the piston and to the "excess pressure" due to the combustion of the injected fuel.

The majority of the direct injection motors from recent years do not take into account the pressure prevailing in the cylinder in order to command the injector. Indeed, this parameter is ignored since it was considered that it had little influence on the injection of fuel. However, new designs of engines make the quantity of fuel injected into a cylinder more sensitive to the pressure prevailing in said cylinder. Indeed, the quantity of fuel to be injected into the cylinder is linked to the difference between the pressure of the supply rail which varies, for example, for a diesel engine, between 200 bar and 2000 bar depending on the load of the engine and the pressure in the cylinder which varies between 0 bar and 100 bar. The larger the engine load, the higher therefore is the pressure of the supply rail, and the more the pressure in the cylinder is insignificant with respect to the pressure of the fuel injected. By contrast, the zones of small load, and therefore of low pressure, are very sensitive to the pressure prevailing in the cylinder. The new engines therefore make it necessary to take account of the pressure in the cylinder in order to obtain extremely accurate injections.

Document U.S. Pat. No. 6,782,737 proposes a system for estimating the pressure maximum peak in the cylinder comprising a pressure sensor, a temperature sensor, means for determining the ratio between the load and the quantity of fuel injected and a control computer determining the start of the injection. The pressure maximum peak is estimated as a function of the pressure and of the temperature of the fuel, of said ratio and of the start of the injection. This estimation is used as data in order to limit the nitrogen oxide ($NO_x$) emissions.

This document focuses on the estimation of the pressure maximum peak corresponding to the main injection. However, the current engines include multi-injection systems where each injection influences the following injection. The accuracy of the estimation provided by the system of this document can therefore be improved.

Moreover, the pressure estimating system disclosed by this document uses sensors which measure the pressure retrospectively. The solution proposed by this document cannot therefore be used effectively as an estimation predictive model.

Furthermore, this system comprises complex calculations which are not suited to real-time estimation.

Documents WO2005/103640A2, FR2892459A3, DE102012221245A1, and DE102008044013A1 are also known, which relate to methods for estimating the pressure in the cylinders of an internal combustion engine.

The invention aims to eliminate or at least reduce, all or some of the aforementioned disadvantages of the prior art.

The aim of the present invention is then to propose a method for accurately and predictively determining the value of the total pressure in the cylinder along at least part of an engine cycle.

Advantageously, the present invention will also allow for working in real time in order to precisely control the quantity of fuel to be injected as a function of the pressure levels prevailing in the cylinder.

The method according to the invention will also preferably be easy to adjust and/or extremely reliable and/or have a moderate cost price.

To this end, the present invention proposes a method for determining the total pressure in a cylinder of an engine as a function of the angular position of a crankshaft and from a quantity of fuel to be injected in possibly several injections. According to the invention, the method comprises the following steps:

determining the pressure in the cylinder when there is no combustion, said pressure being called the pressure without combustion, determining, for each injection, a curve of sub-variation of pressure caused by the combustion of the fuel quantity injected during the injection in question, the shape of the curve being estimated as a function of the quantity of fuel to be injected and of the angular position for start of injection of the corresponding injection, determining the total pressure in the cylinder by adding together the pressure without combustion and the pressures given by the pressure sub-variation curves of each injection.

This method thus allows, in a direct injection engine, for reliably determining the total pressure in the cylinder. The tests carried out have shown that such a method is particularly well suited for accurately predicting the pressure in the cylinder and for being installed in an engine computer.

In addition, this method advantageously allows some calculations to be eliminated, such as thermodynamic calculations or enthalpy balances or energy balances or mass balances, which are too long and not compatible with a real-time calculation.

According to an advantageous embodiment for simplifying the calculations without significantly affecting the accuracy, the pressure without combustion is determined by considering that the compression and the expansion of the gas mixture contained in the cylinder are adiabatic and that said mixture behaves like an ideal gas, said determination being linearly corrected as a function of the cooling temperature and of the exhaust gas recirculation rate.

Furthermore, in a preferred embodiment, each pressure sub-variation curve is determined by a relationship between the combustion efficiency, the quantity of fuel to be injected, the volume of the cylinder relative to the angular position of the crankshaft, the combustion start slope of the pressure sub-variation curve, the angular position for start of combustion of the crankshaft, the combustion end slope of the pressure sub-variation curve and the angular position for end of combustion of the crankshaft.

This method taking into account the influence of all injections advantageously allows a form of empirical determination of the pressure in the cylinder for multi-injection systems.

Such a stage for determining each pressure sub-variation, according to embodiments of the invention taken alone or in combination, may be such that:
  the combustion efficiency is determined from a base value which is corrected as a function of the cooling temperature of the fuel and of the pressure of the fuel at injection,
  each combustion start slope is determined from a base value which is corrected as a function of the quantity of fuel to be injected, the exhaust gas recirculation rate and the time between the previous injection and the corresponding injection,
  the angular position for start of combustion of the crankshaft is determined by adding together the angular position for start of injection and a time constant which is, itself, determined from a base value which is linearly corrected as a function of the quantity of fuel to be injected and of the exhaust gas recirculation rate,
  the combustion end slope is determined by a linear relationship as a function of the angular position for start of injection,
  the angular position for end of combustion is determined by a linear relationship between the angular position for start of combustion, the rate of the combustion and the quantity of fuel to be injected.

The linearity of the calculations proposed here allow the pressure in the cylinder to be determined in a simple and quick way, therefore reducing the costs.

The present invention further relates to a device for determining the total pressure of an engine cylinder as a function of the angular position of a crankshaft, comprising means for implementing each of the steps of a method according to the invention. This device directly installed in a computer for controlling the engine allows, advantageously, the estimation calculating speed to be improved. Indeed, this device allows the total pressure in the cylinder to be estimated in real time and predictively before the injection. It does not require, advantageously, a pressure sensor inside the cylinder.

Finally, the present invention relates to a device for controlling the quantity of fuel to be injected into an engine cylinder as a function of the total pressure in the cylinder, comprising a device for determining the total pressure in a cylinder described above. This device advantageously allows, thanks to the estimation of the total pressure in a cylinder, a more fine and controlled injection to be produced. This therefore allows a combustion that is better suited and closer to the desired engine performance to be obtained, reducing the losses and therefore the fuel consumption.

Figure 1:
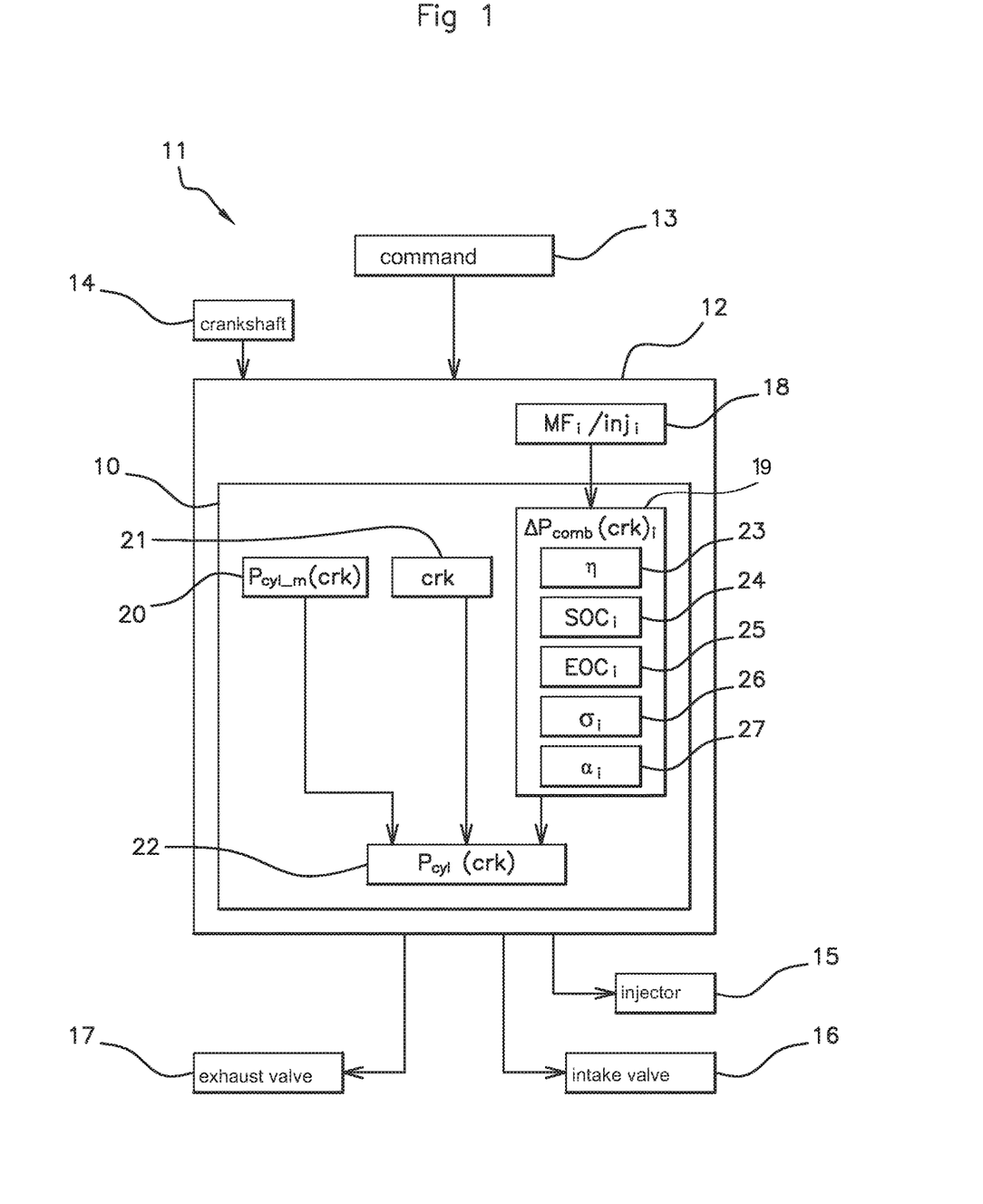
FIG. 1 is a block diagram illustrating a determining device according to an embodiment of the present invention.

Details and advantages of the present invention will emerge more clearly upon reading the following description, with reference to the appended schematic drawings in which:

FIG. 1 illustrates the general structure of an embodiment of a determining device 10 for determining the pressure within a cylinder $P_{cyl}$ in an engine as a function of the angular position crk of a crankshaft 14 of said engine.

FIG. 1 also schematically illustrates the general structure of an embodiment of a device 11 for controlling the quantity of fuel to be injected into said engine cylinder as a function of the pressure in the cylinder $P_{cyl}$.

A control device 11 comprises a control unit 12, for example a microprocessor, in which the determining device 10 is installed. The control device 11 receives information from the user through a command 13, for example the vehicle pedals, which information is transmitted to the control unit 12. This information allows for determining the torque required of the engine and thus for managing various blocks such as an injector 15, and optionally an intake valve 16 and an exhaust valve 17. In addition, the control unit 12 comprises a unit 18 arranged to define the quantity of fuel to be injected $MF_i$ into the cylinder for each injection $inj_i$.

The determining device 10 comprises:
  a unit 19 arranged to determine, by calculation, a pressure sub-variation curve $\Delta P_{comb\_i}$ corresponding to a combustion for each injection $inj_i$,
  a unit 20 arranged to determine, by calculation, the pressure, called the pressure without combustion $P_{cyl\_m}$, in the cylinder when there is no combustion, and
  a unit 22 arranged to determine, by calculation, the pressure in the cylinder $P_{cyl}$ from the information provided by the aforementioned units.

The unit 19 is, preferably, formed from several blocks for each determining a parameter necessary for determining the pressure sub-variation curve $\Delta P_{comb\_i}$. It therefore comprises:
  a block 23 arranged to determine the combustion efficiency $\eta$,
  a block 24 arranged to determine the angular position of the crankshaft 14 at the start of the combustion $SOC_i$ for each injection $inj_i$,
  a block 25 arranged to determine the angular position of the crankshaft 14 at the end of combustion $EOC_i$ for each injection $inj_i$,
  a block 26 arranged for determining the combustion start slope $\sigma_i$ of said curve for each injection $inj_i$, and
  a block 27 arranged to determine the combustion end slope $\alpha_i$ of said curve for each injection $inj_i$.

Figure 2:
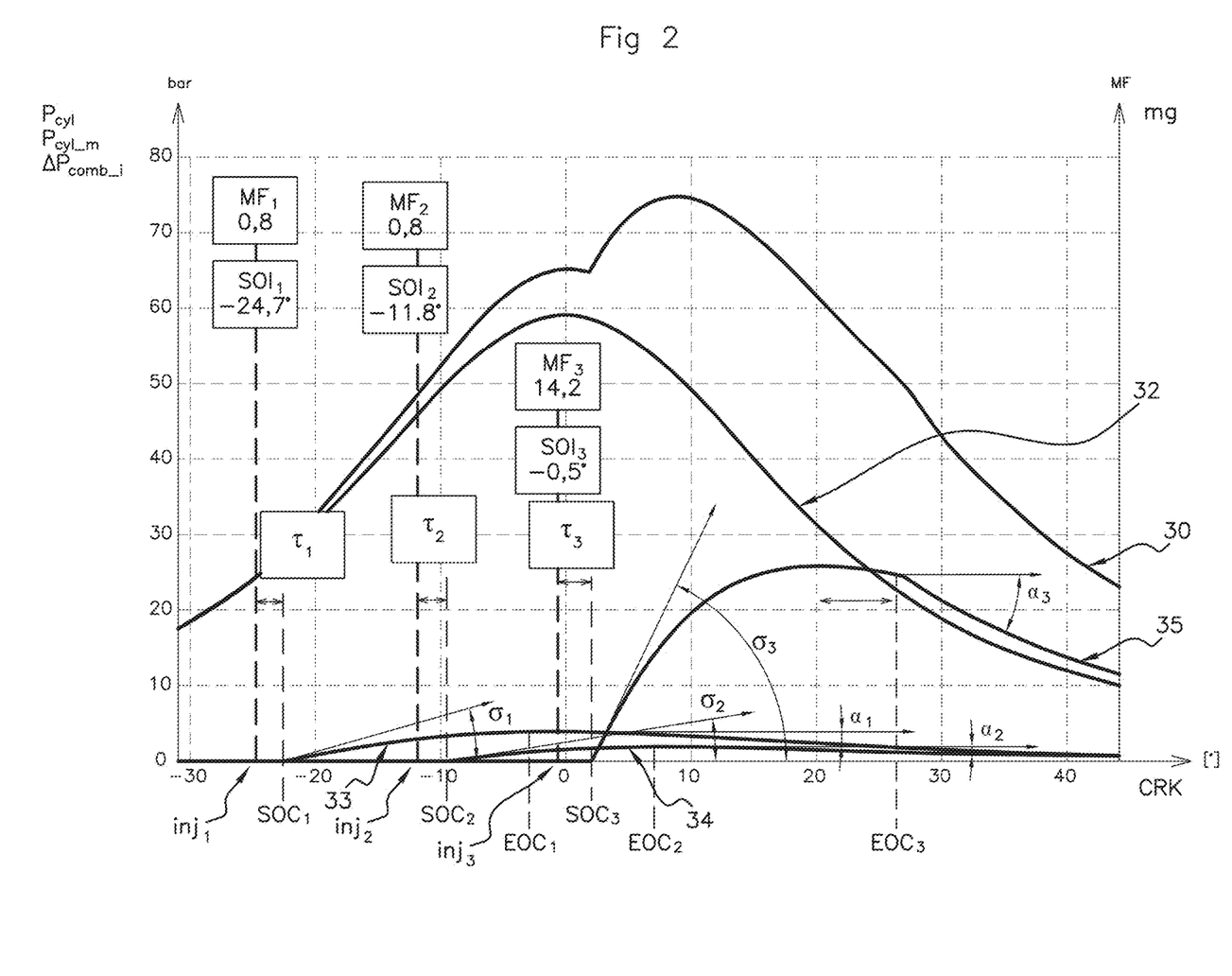
FIG. 2 is a general graph of the pressure in a cylinder as a function of the angular position of the crankshaft according to an exemplary embodiment of the present invention.

FIG. 2 illustrates the result of an example of implementing the determining device 10. FIG. 2 therefore shows a graph for the total pressure in the cylinder $P_{cyl}$, in bar, and the quantity of fuel $MF_i$ to be injected in mg ($MF_1$=0.8 mg, $MF_2$=0.8 mg, $MF_3$=14.2 mg) as a function of the angular position crk, in degrees, of the crankshaft 14. The angular position range has been chosen such as to only represent the cycle about the fuel injections. Thus, in FIG. 2 (as for FIG. 3), the angular position of the crankshaft 14 varies from −40° to +40° with the point 0° corresponding to the upper dead center (PMH) of a piston corresponding to the cylinder in question.

A curve 30 represents the total pressure in the cylinder $P_{cyl}$, which pressure is estimated by the determining device 10 before the engine cycle takes place. The gas mixture introduced into the cylinder is compressed by a piston and fuel is injected. In the present exemplary embodiment, it is assumed that there are three consecutive injections: a first pilot pre-injection $inj_1$, a second pilot pre-injection $inj_2$, then a main injection $inj_3$. It is clearly observed that the total pressure in the cylinder $P_{cyl}$ increases with each injection of fuel, especially during the main injection, then decreases when the combustion ends and the piston goes back down, the curve 30 tending to a minimum pressure.

The estimation of the curve 30 is based on the calculation of the pressure without combustion $P_{cyl\_m}$, illustrated by a curve 32, and on the calculation of pressure sub-variation curves $\Delta P_{comb\_i}$ brought about by each injection $inj_i$.

Each of the injections of FIG. 2 produces a significant pressure sub-variation during the combustion. Each injection $inj_1$, $inj_2$, $inj_3$ starts at a certain angular position of the crankshaft 14 corresponding to each of the angular positions for start of injection $SOI_1$, $SOI_2$, $SOI_3$, respectively. Shortly after each of the injections, the combustion begins, at angular positions for start of combustion $SOC_1$, $SOC_2$, $SOC_3$, respectively, with an increase in the pressure to a certain point and then the combustion ends, at angular positions for end of combustion $EOC_1$, $EOC_2$, $EOC_3$, respectively, with the pressure decreasing until approaching zero. Curves 33, 34, 35 illustrate the pressure sub-variations $\Delta P_{comb\_i}$ due to the injections $inj_i$.

The curve 35 has a large pressure variation due to the greatest quantity of fuel injected. The main injection therefore has a greater influence on the behavior of the pressure in the cylinder $P_{cyl}$. However, it is observed that the pressure sub-variations of the curves 33, 34 are not zero during the main injection $inj_3$. Therefore, they also influence this injection and, thus, the overall pressure in the cylinder $P_{cyl}$.

Figure 4:
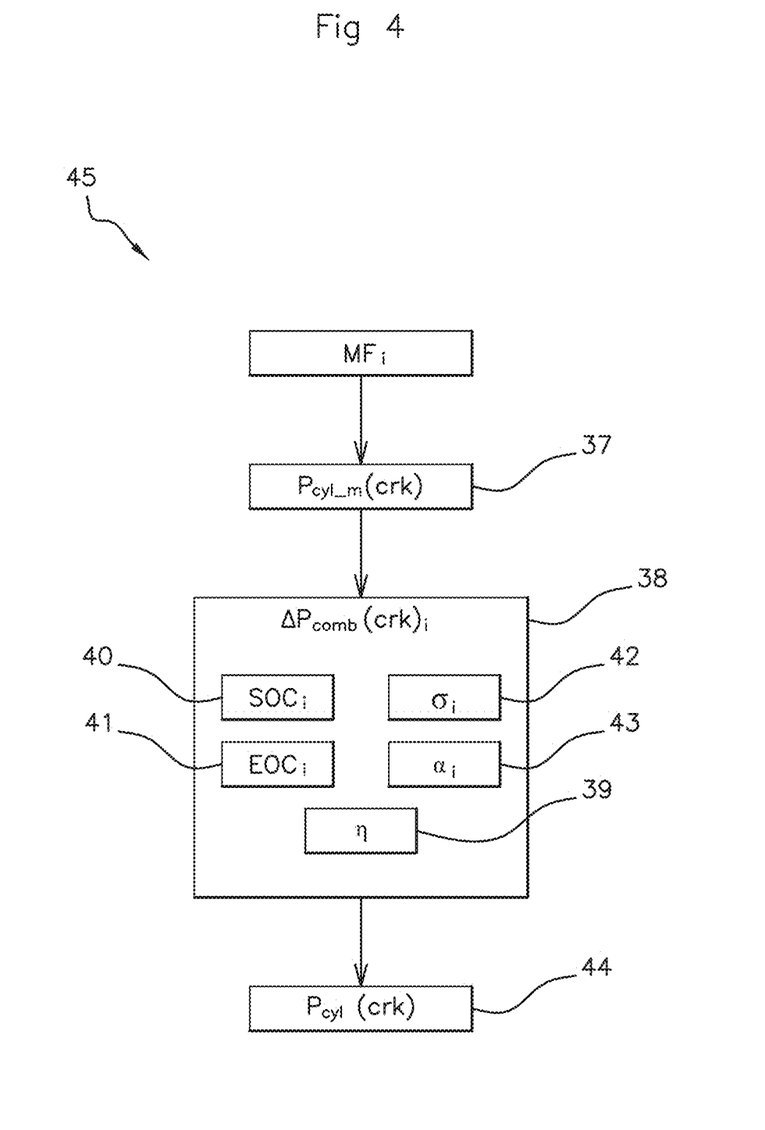
FIG. 4 is an activity diagram illustrating a method according to the present invention.

In order to calculate the total pressure in the cylinder $P_{cyl}$, a method 45 for determining this pressure is proposed in this document, described using FIG. 4.

As shown in FIG. 4, starting from a quantity of fuel to be injected $MF_i$, a first step 37 is a step for determining the pressure without combustion $P_{cyl\_m}$, followed by steps 38 for determining each pressure sub-variation curve $\Delta P_{comb\_i}$. The chronological order between the step 37 and the steps 38 can vary: these steps can even take place in parallel since they are independent. Moreover, the pressure without combustion $P_{cyl\_m}$ and the pressure sub-variation curves $\Delta P_{comb\_i}$ are calculated as a function of the angular position crk of the crankshaft 14.

The step 37 consists in calculating the pressure without combustion $P_{cyl\_m}$ from a relationship 50 corresponding to adiabatic compression and expansion and from a linear correction relationship 51.

The relationship 50 considers the Laplace coefficient $\gamma$ and is dependent upon the pressure of an intake inlet $P_{intake}$ of said cylinder and the volume relating to the angular position crk. In the relationship 50, the value $V_{IVC}$ refers to the volume of the combustion chamber when the intake valve closes, and the value $V(crk)$ refers to the volume V relating to the angular position crk.

$$P_{cyl\_m1}(crk) = P_{intake}\left(\frac{V_{IVC}}{V(crk)}\right)^{\gamma} \quad (50)$$

The relationship 51 is formed from a base value, corresponding to the result of the relationship 50, to which several linear corrections are added. The latter can be, each, formed from a constant and from a coefficient relating to the parameters of the injection $inj_i$. In this case, a first correction $cor_{TCO}$ is dependent upon the cooling temperature TCO and a second correction $cor_{EGR}$ is dependent upon the exhaust gas recirculation rate EGR.

$$P_{cyl\_m}(crk) = \quad (51)$$

$$P_{cyl\_m1}(crk) * \left(1 + cor_{TCO}\frac{TCO}{TCO_{max}}\right) * \left(1 + cor_{EGR}\frac{EGR}{EGR_{max}}\right)$$

Each step 38 consists in calculating a pressure sub-variation curve $\Delta P_{comb\_i}$ and, more precisely, in determining the shape of the corresponding curve. To this end, each of the curves is estimated in the same way using a relationship 52 which is dependent upon the efficiency of the combustion $\eta$, the quantity of fuel to be injected $MF_i$, the volume V relating to the angular position crk, the volume of the cylinder when the piston is at the upper dead center $V_{PMH}$ and the combustion start slope $\sigma_i$ of said curve, the angular position for start of combustion $SOC_i$, the combustion end slope $\alpha_i$ of said curve and the angular position for end of combustion $EOC_i$.

$$\Delta P_{comb}(crk)_i = \quad (52)$$

$$\eta * MF_i * \left[\frac{(crk - SOC_i)}{(crk - SOC_i) + \sigma_i} * \min\left(\frac{(crk - EOC_i)}{(crk - EOC_i) + \alpha_i}, 1\right)\right] * \frac{V_{PMH}}{V(crk)}$$

The method 45 then comprises, within each step 38, several sub-steps, each consisting in calculating one of the parameters of the relationship 52.

A sub-step 39 consists in calculating the combustion efficiency $\eta$, in bar/mg, using a linear relationship 53. This relationship comprises a base value $cste_\eta$ to which are added several linear corrections. Each of the corrections can be formed from a constant and from a coefficient relating to the parameters of the injection $inj_i$. In this case, a first correction $cor_{FUP}$ is dependent upon the pressure of the fuel FUR at the injection and a second correction $cor_{TCO}$ is dependent upon the cooling temperature $TCO_i$. Indeed, the more the engine is cooled, the more the combustion efficiency $\eta$ reduces, i.e. the number of unburnt residues increases.

$$\eta = cste_\eta * \left(1 + cor_{FUP}\frac{FUP_i}{FUP_{max}}\right) * \left(1 + cor_{TCO}\frac{TCO_i}{TCO_{max}}\right) \quad (53)$$

In this example, the parameters of the relationship 55, of the relationship 56, 57 and of the relationship 58 are firstly estimated in seconds to simplify the calculations, then converted to angular degrees. For this purpose, the conversion is produced in this case from the relationship 54 where N is the engine speed.

$$x(*crk)=6*N*x(s) \quad (54)$$

The angular position for start of combustion $SOC_i$ is determined by the relationship 55 where $\tau_i$ is a time period for auto-ignition of the fuel, as shown in FIG. 2.

$$SOC_i=SOI_i+\tau_i \quad (55)$$

The auto-ignition time period $\tau_i$ can be estimated in seconds in a linear manner by the relationship 56 which comprises a base value $cste_\tau$ to which several linear corrections are added. Each of the corrections can be formed from a constant and from a coefficient relating to the parameters of the injection $inj_i$. For the auto-ignition time period $\tau_i$, a first correction $cor_{MF}$ is dependent upon the quantity of fuel $MF_i$ and a second correction $cor_{EGR}$ is dependent upon the exhaust gas recirculation rate $EGR_i$. These two corrections are each approximately 40% with respect to the overall correction value. The auto-ignition time period $\tau_i$ also comprises a third correction $cor_{T_{DIFF}}$ dependent upon the time $T_{DIFFi}$ between the previous injection $inj_{i-1}$ and the injection $inj_i$, a fourth correction $cor_{FUP}$ dependent upon the fuel pressure $FUP_i$ at injection and a fifth correction $cor_{TCO}$ is dependent upon the cooling temperature $TCO_i$.

$$\tau_i = cste_\tau * \left(1 + cor_{MF} \frac{MF_i}{MF_{max}}\right) * \\ \left(1 + cor_{EGR} \frac{EGR_i}{EGR_{max}}\right) * \left(1 + cor_{T_{DIFF}} \frac{T_{DIFFi}}{T_{DIFFmax}}\right) * \\ \left(1 + cor_{FUP} \frac{FUP_i}{FUP_{max}}\right) * \left(1 + cor_{TCO} \frac{TCO_i}{TCO_{max}}\right) \quad (56)$$

To calculate the angular position for start of combustion $SOC_i$, the auto-ignition time period $\tau_i$ of the relationship 56 can be converted to degrees by the relationship 54.

A sub-step 41 for determining the angular position for end of combustion $EOC_i$ is determined by the relationship 57 where $\lambda$ gives the combustion rate initially in mg·s$^{-1}$ and converted into °crk.s$^{-1}$.

$$EOC_i = SOC_i + \left(\frac{MF_i}{\lambda}\right) \quad (57)$$

A sub-step 42 consists in determining the slope $\sigma_i$ of the sub-variation curve in question at the start of combustion. It can be estimated in seconds in a linear manner by the relationship 58 which comprises a base value $cste_\sigma$ to which several linear corrections are added. The latter can be, each, formed from a constant and from a coefficient relating to the parameters of the injection $inj_i$. In this case, the corrections are dependent upon the quantity of fuel $MF_i$, the exhaust gas recirculation rate $EGR_i$ and the time $T_{DIFFi}$ between the previous injection $inj_{i-1}$, and the injection $inj_i$.

$$\sigma_i = cste_\sigma * \left(1 + cor_{MF} \frac{MF_i}{MF_{max}}\right) * \\ \left(1 + cor_{EGR} \frac{EGR_i}{EGR_{max}}\right) * \left(1 + cor_{T_{DIFF}} \frac{T_{DIFFi}}{T_{DIFFmax}}\right) \quad (58)$$

A sub-step 43 allows the slope $\alpha_i$ to be calculated. It varies as a function of the angular position for start of injection $SOI_i$ for the injection in question $inj_i$. Indeed, the further away the injection is from the position PMH of the piston, the more slowly the combustion end slope $\alpha_i$ progresses. The slope $\alpha_i$ can therefore be calibrated. For example, it is calculated using an interpolation table.

A step 44 then allows the final pressure to be estimated by adding together the pressure without combustion $P_{cyl\_m}$ and each of the pressure sub-variations $\Delta P_{comb\_i}$ using the relationship 59 where n is the total number of injections $inj_i$.

$$P_{cyl}(crk) = P_{cyl\_m}(crk) + \Sigma_{i=1}^n \Delta P_{comb}(crk)_i \quad (59)$$

Figure 3:
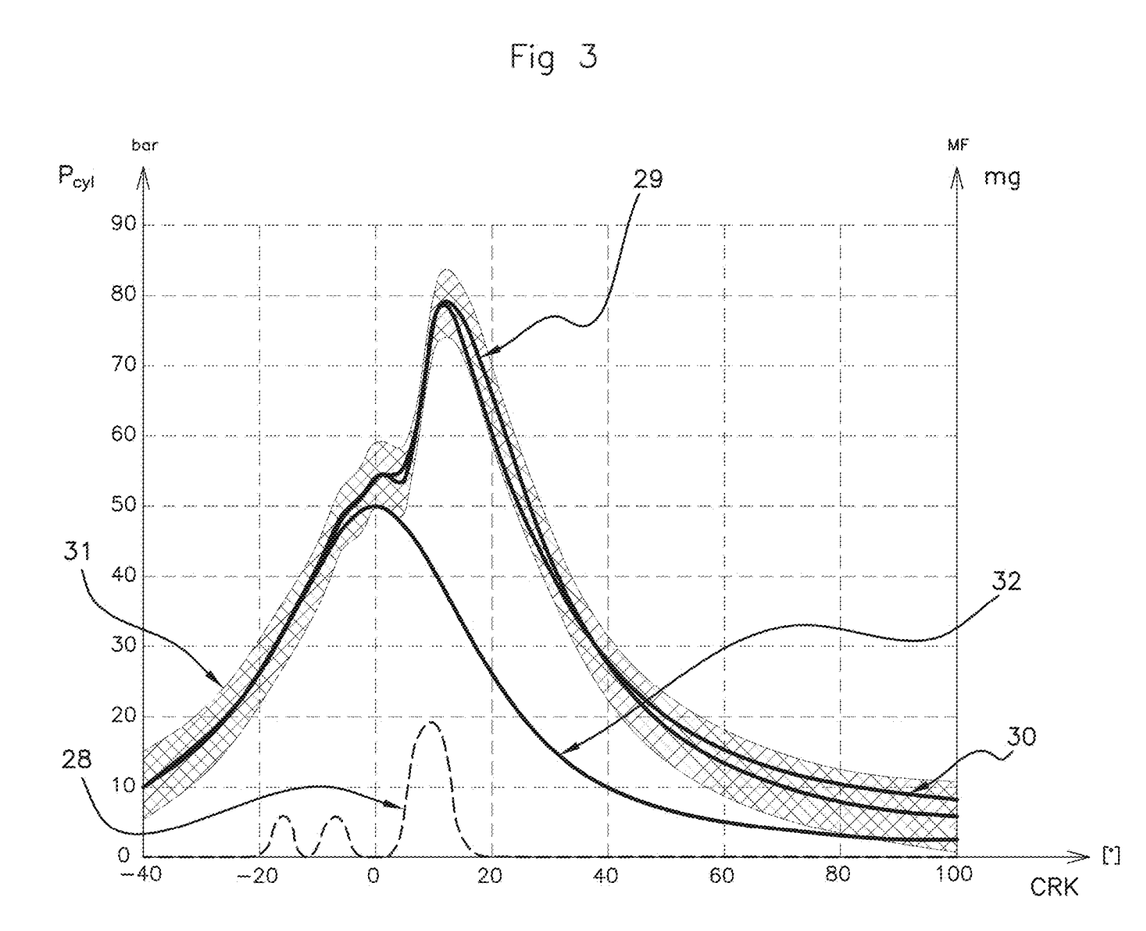
FIG. 3 is a validation graph for the present invention.

FIG. 3 illustrates, for an injection similar to that of FIG. 2, the results obtained with the determining method described above. However, the injections $inj_1$, $inj_2$, $inj_3$ of FIG. 3 differ slightly from those of FIG. 2. The curve 28 illustrates the various injections. As for FIG. 2, this example comprises three injections: a first pilot pre-injection, a second pilot pre-injection, then a main injection.

A curve 29 shows a measurement of the pressure in the cylinder $P_{cyl}$ undertaken to validate the proposed method.

The curve 30 diagrammatically shows the total pressure in the cylinder $P_{cyl}$ estimated by the determining device 10 before the engine cycle takes place (predictive estimate). It is observed that the curve 30 is very close to the curve 29. Indeed, the difference between these two curves does not exceed a threshold of +/−5 bar, illustrated in the figure by an interval 31, in the pre-injection zone, also called the compression zone, and a threshold of +/−10 bar in the combustion zone.

The present invention therefore allows for simply predicting the pressure in an engine cylinder while achieving very good accuracy.

The present invention also allows the pressure in the cylinder to be estimated by taking into account all of the injections of an engine cycle, i.e. both the pre-injections and the main injection or the injections subsequent to the main injection.

Estimating the pressure in the cylinder at the time of commanding the injection allows the control of the quantity of fuel injected into the engine to be effectively adjusted by acting, for example, on the injector opening duration.

The present invention can be used, for example, in devices implementing engines, for example, compression ignition engines also called diesel engines or also positive ignition engines also called gasoline engines. The present invention can therefore be easily applied to different engines.

The correction parameters described above are dependent upon the engine and the desired level of accuracy. It will not therefore be a departure from the scope of the invention to add a correction coefficient to account for a parameter not stated here.

Of course, the present invention is not limited to the embodiment shown above by way of non-limiting example. It also relates to the alternative embodiments within the capabilities of a person skilled in the art within the scope of the claims hereafter.

The invention claimed is:

1. A method for determining a total pressure in a cylinder ($P_{cyl}$) of an engine as a function of an angular position (crk) of a crankshaft (14) and from a quantity of fuel to be injected in possibly several injections, and for controlling a quantity of fuel injected into the engine, the method comprising:
    determining the pressure in the cylinder when there is no combustion, said pressure being called the pressure without combustion ($P_{cyl\_m}$),
    determining, for each injection ($inj_i$), a curve of sub-variation of pressure ($\Delta P_{comb\_i}$) caused by a combustion of the fuel quantity injected during the injection ($inj_i$) in question, a shape of the curve being estimated as a function of the quantity of fuel ($MF_i$) to be injected and of an angular position for start of injection ($SOI_i$) of the corresponding injection,
    determining the total pressure in the cylinder ($P_{cyl}$) by adding together the pressure without combustion ($P_{cyl\_m}$) and the pressures given by the pressure sub-variation curves ($\Delta P_{comb\_i}$) of each injection ($inj_i$),
    adjusting an injector opening duration based on the total pressure of the cylinder.

2. The method as claimed in claim 1, wherein the pressure without combustion ($P_{cyl\_m}$) is determined by considering that a compression and an expansion of the gas mixture contained in the cylinder are adiabatic and that said mixture behaves like an ideal gas, said determination being linearly corrected as a function of a cooling temperature (TCO) and of an exhaust gas recirculation rate (EGR).

3. The method as claimed in claim 1, wherein each pressure sub-variation curve ($\Delta P_{comb\_i}$) is determined by a relationship between a combustion efficiency ($\eta$), the quantity of fuel to be injected ($MF_i$), a volume of the cylinder relative to the angular position (crk) of the crankshaft (14), the combustion start slope ($\sigma_i$) of the pressure sub-variation curve ($\Delta P_{comb\_i}$), an angular position for the start of combustion ($SOC_i$) of the crankshaft (14), a combustion end slope ($\alpha_i$) of the pressure sub-variation curve ($\Delta P_{comb\_i}$) and an angular position for the end of combustion ($EOC_i$) of the crankshaft (14).

4. The method as claimed in claim 3, wherein the combustion efficiency ($\eta$) is determined from a base value ($ctse_\eta$) which is corrected as a function of a cooling temperature of the fuel ($TCO_i$) and of a pressure of the fuel ($FUP_i$) at injection.

5. The method as claimed in claim 3, wherein each combustion start slope ($\sigma_i$) is determined from a base value ($ctse_\sigma$) which is corrected as a function of the quantity of fuel to be injected ($MF_i$), an exhaust gas recirculation rate (EGR) and a time ($T_{DIFFi}$) between a previous injection ($inj_{i-1}$) and the corresponding injection ($inj_i$).

6. The method as claimed in claim 3, wherein the angular position for start of combustion ($SOC_i$) of the crankshaft is determined by adding together the angular position for start of injection ($SOI_i$) and a time constant ($\tau_i$) which is, itself, determined from a base value ($ctse_\tau$) which is linearly corrected as a function of the quantity of fuel to be injected ($MF_i$) and of an exhaust gas recirculation rate (EGR).

7. The method as claimed in claim 3, wherein the combustion end slope ($\alpha_i$) is determined by a linear relationship as a function of the angular position for start of injection ($SOI_i$).

8. The method as claimed in claim 3, wherein the angular position for end of combustion ($EOC_i$) is determined by a linear relationship between the angular position for start of combustion ($SOC_i$), a rate of the combustion ($\lambda$) and the quantity of fuel to be injected ($MF_i$).

9. A device for determining a total pressure of an engine cylinder ($P_{cyl}$) as a function of an angular position (crk) of a crankshaft (14), comprising:
means for determining the pressure in the cylinder when there is no combustion, said pressure being called the pressure without combustion ($P_{cyl\_m}$),
means for determining, for each injection ($inj_i$), a curve of sub-variation of pressure ($\Delta P_{comb\_i}$) caused by a combustion of the fuel quantity injected during the injection ($inj_i$) in question, a shape of the curve being estimated as a function of the quantity of fuel ($MF_i$) to be injected and of an angular position for start of injection ($SOI_i$) of the corresponding injection,
means for determining the total pressure in the cylinder ($P_{cyl}$) by adding together the pressure without combustion ($P_{cyl\_m}$) and the pressures given by the pressure sub-variation curves ($\Delta P_{comb\_i}$) of each injection ($inj_i$).

10. A device for controlling a quantity of fuel to be injected into an engine cylinder as a function of the total pressure in the cylinder ($P_{cyl}$), comprising a control unit (12) in which the device for determining according to claim 9 is installed.

11. The method as claimed in claim 2, wherein each pressure sub-variation curve ($\Delta P_{comb\_i}$) is determined by a relationship between a combustion efficiency ($\eta$), the quantity of fuel to be injected ($MF_i$), a volume of the cylinder relative to the angular position (crk) of the crankshaft (14), a combustion start slope ($\sigma_i$) of the pressure sub-variation curve ($\Delta P_{comb\_i}$), an angular position for the start of combustion ($SOC_i$) of the crankshaft (14), a combustion end slope ($\alpha_i$) of the pressure sub-variation curve ($\Delta P_{comb\_i}$) and an angular position for the end of combustion ($EOC_i$) of the crankshaft (14).

12. The method as claimed in claim 4, wherein each combustion start slope ($\sigma_i$) is determined from a second base value ($ctse_\sigma$) which is corrected as a function of the quantity of fuel to be injected ($MF_i$), an exhaust gas recirculation rate (EGR) and a time ($T_{DIFFi}$) between a previous injection ($inj_{i-1}$) and the corresponding injection ($inj_i$).

13. The method as claimed in claim 4, wherein the angular position for start of combustion ($SOC_i$) of the crankshaft is determined by adding together the angular position for start of injection ($SOI_i$) and a time constant ($\tau_i$) which is, itself, determined from a second base value ($ctse_\tau$) which is linearly corrected as a function of the quantity of fuel to be injected ($MF_i$) and of an exhaust gas recirculation rate (EGR).

14. The method as claimed in claim 5, wherein the angular position for start of combustion ($SOC_i$) of the crankshaft is determined by adding together the angular position for start of injection ($SOI_i$) and a time constant ($\tau_i$) which is, itself, determined from a second base value ($ctse_\tau$) which is linearly corrected as a function of the quantity of fuel to be injected ($MF_i$) and of an exhaust gas recirculation rate (EGR).

15. The method as claimed in claim 4, wherein the combustion end slope ($\alpha_i$) is determined by a linear relationship as a function of the angular position for start of injection ($SOI_i$).

16. The method as claimed in claim 5, wherein the combustion end slope ($\alpha_i$) is determined by a linear relationship as a function of the angular position for start of injection ($SOI_i$).

17. The method as claimed in claim 6, wherein the combustion end slope ($\alpha_i$) is determined by a linear relationship as a function of the angular position for start of injection ($SOI_i$).

18. The method as claimed in claim 4, wherein the angular position for end of combustion ($EOC_i$) is determined by a linear relationship between the angular position for start of combustion ($SOC_i$), a rate of the combustion ($\lambda$) and the quantity of fuel to be injected ($MF_i$).

19. The method as claimed in claim 5, wherein the angular position for end of combustion ($EOC_i$) is determined by a linear relationship between the angular position for start of combustion ($SOC_i$), a rate of the combustion ($\lambda$) and the quantity of fuel to be injected ($MF_i$).

20. The method as claimed in claim 6, wherein the angular position for end of combustion ($EOC_i$) is determined by a linear relationship between the angular position for start of combustion ($SOC_i$), a rate of the combustion ($\lambda$) and the quantity of fuel to be injected ($MF_i$).

* * * * *